United States Patent [19]
Rambauske

[11] 3,827,059
[45] July 30, 1974

[54] CATOPTRIC LENS ARRANGEMENT

[75] Inventor: Werner R. Rambauske, Carlisle, Mass.

[73] Assignee: Raytheon Company, Lexington, Mass.

[22] Filed: July 3, 1972

[21] Appl. No.: 268,272

[52] U.S. Cl.................. 350/294, 350/293, 350/299
[51] Int. Cl............................................. G02b 5/10
[58] Field of Search........... 350/199, 288, 293, 294, 350/299; 331/94.5; 240/41.1

[56] References Cited
UNITED STATES PATENTS

| | | | |
|---|---|---|---|
| 2,198,014 | 4/1940 | Ott | 350/294 |
| 3,229,579 | 1/1966 | Lessley | 350/294 |
| 3,367,607 | 2/1968 | Bowen, Jr. | 350/294 |
| 3,453,425 | 7/1969 | Whitaker | 240/41.1 |

Primary Examiner—John K. Corbin
Assistant Examiner—Michael J. Tokar
Attorney, Agent, or Firm—Philip J. McFarland; Joseph D. Pannone

[57] ABSTRACT

Catoptric lens arrangements for combining energy from a number of sources, as light energy from a number of lasers, are shown. The disclosed arrangements include mirrors with reflecting surfaces having focal points spaced from a common axis of symmetry. With such reflecting surfaces (generated by nutating selected quadratic sections about the axis of symmetry), energy from a number of lasers may be focused at a focal point of the reflecting surface of an exit mirror.

9 Claims, 4 Drawing Figures

CATOPTRIC LENS ARRANGEMENT

BACKGROUND OF THE INVENTION

This invention pertains generally to catoptric lens arrangements and particularly to such types of arrangements having lens elements with focal points spaced from the lens axis.

It is now known in the art that so-called "confocal" catoptric lens arrangements, i.e. arrangements incorporating reflecting surfaces corresponding to the curved surface generated by nutating selected quadratic conic sections about a lens axis, combine many desirable qualities. Reflecting surfaces so generated characteristically possess image points on a circle, or an arc of a circle, centered on an axis rather than a single point as in the usual case. Thus, by judiciously selecting particular conic sections for the generatrices of the reflecting surfaces of the elements of a catoptric lens arrangement, it is possible to design such an arrangement to be diffraction-limited with an extremely large aperture. It follows, then, that the f-number of such a lens arrangement may be far less than 1. Such a characteristic, in turn, means that radiant energy from a point source may, if desired, be focused within a very small circle of confusion; as a matter of fact, focusing may take place within a circle of confusion with a diameter in the same order as the wavelength of radiant energy. Alternatively, if desired, an almost perfectly collimated beam of radiant energy may be formed from radiant energy from a point source, because the diffraction effects suffered by such a catoptric lens arrangement are very small.

It is evident that confocal catoptric lens arrangements are particularly well suited for applications in which conventional refractive lens arrangements are, for one reason or another, not satisfactory. For example, when the radiant energy to be focused or collimated is concentrated in an intense beam, as in the beam from a high-powered laser, a sufficient amount of such energy incident on a refractive lens arrangement is absorbed by the material from which the lens elements are fabricated (some type of glass, mica or other solid material ordinarily deemed to be totally transparent) thereby causing undue heating which distorts, or even destroys, the lens elements.

Although a catoptric lens arrangement is not as susceptible to damage from overheating because energy passing through such an arrangement is almost completely reflected by the mirror surfaces of the lens elements, there is, however, a slight amount of energy absorbed by each lens element to cause heating. Therefore, especially when it is necessary to combine beams from more than a single high powered laser, even catoptric lens arrangements may be unduly heated. There simply is no known way of making the reflecting surface of lens elements in a catoptric lens arrangement to provide reflecting surfaces which are certain to withstand the enormous concentrations of energy resulting from the use of several high power lasers. Further, with any catoptric lens arrangement not using confocality principles, appreciable aperture blockage must be tolerated in order to arrange the lens elements in proper relative position with respect to each other.

It has been proposed to carry out thermal nuclear fusion by combining the beams from a number of high powered lasers in such a manner that the energy in each beam is focused on a small target. It is possible in such a system to obtain a flux density at the target which is sufficiently high to initiate the fusion reaction. That is, a flux density in the order of $10^{14}$ to $10^{16}$ watts per square centimeter may be attained. When energy with a flux density of such intensity is attained, a concomitant light pressure (in the order of the pressure required to contain the expanding plasma resulting from a nuclear reaction) is generated. Obviously, however, successful containment of an expanding plasma from a real specimen undergoing fusion requires that the light pressure be applied over a continuous finite area. In other words, any lens arrangement suited to the purpose must be capable of forming an "optical compressor."

In the design of optical radars it would be highly desirable to combine beams from several lasers into a composite beam, thereby to increase the effective range of the system. Again, in such an application conventional lens arrangements are inadequate for the basic reason that it is almost impossible to collimate energy from more than one source into a single beam. Using conventional lens elements, which have their focal points on a lens axis, in practice only one laser beam may be collimated by any particular known lens arrangement.

SUMMARY OF THE INVENTION

Therefore, it is a primary object of this invention to provide an improved catoptric lens arrangement in which the energy from many high powered lasers may be distributed over relatively large surface areas, retaining the diffraction limited characteristics of such lens arrangement.

Another object of this invention is to provide an improved catoptric lens arrangement by means of which optical energy from a number of high powered lasers may be caused to converge through a wide solid angle on a predetermined surface to form an optical compressor.

In a preferred embodiment of this invention, these and other objects are attained generally by providing a confocal catoptric lens arrangement comprising: (a) a primary, or entrance, lens element with a convex reflecting surface formed from a portion of a first generating ellipse, such portion being rotated about a lens axis (corresponding to nutating the generating ellipse so that one focal point of the generating ellipse is held on the lens axis and the second focal point describes a focal circle orthogonal thereto); and (b) a secondary, or exit, mirror with a concave reflecting surface formed by rotating a portion of a second generating ellipse about the lens axis (corresponding to nutating the second generating ellipse so that one focal point describes a focal circle coincident with, i.e., "confocal to," the focal circle of the first generating ellipse and the second focal point also describes a circle about the lens axis). The beams of a number of lasers are then focused toward the "on-lens axis" focal point of the entrance mirror, each beam falling on the reflecting surface of such mirror. With such a lens arrangement operated in such a manner, the optical energy from each laser converges, from within a relatively large solid angle on a cylindrical surface around the lens axis adjacent to the second focal point of the exit mirror, thereby forming the desired optical compressor.

BRIEF DESCRIPTION OF THE DRAWINGS

For a more complete understanding of this invention reference is now made to the accompanying description of embodiments of this invention as illustrated in the drawings wherein.

DESCRIPTION OF THE PREFERRED EMBODIMENTS

Figure 1:
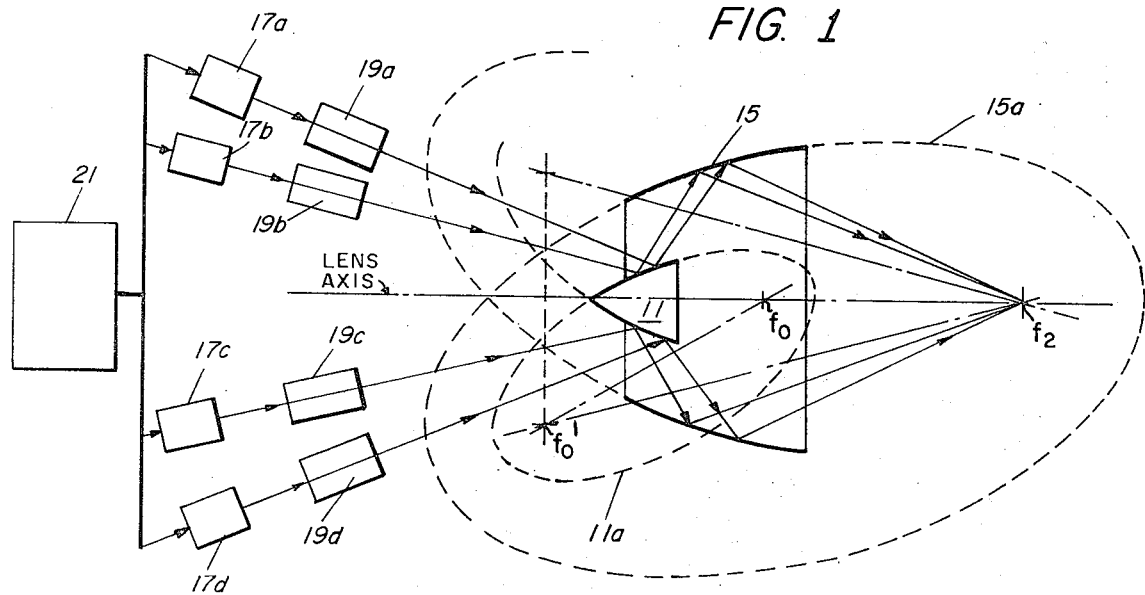
FIG. 1 is a simplified meridional view of a confocal catoptric lens arrangement illustrating how the beams from a number of lasers may be combined to form an optical compressor having a cylindrical surface.

Referring now to FIG. 1 it may be seen that the generatrix of an entrance mirror 11 in a catoptric lens arrangement 13 according to this invention is an ellipse 11a. One focal point, $F_o$, of the ellipse 11a held at a point on the lens axis and the second focal point, $F_o'$, of the ellipse 11a is moved to describe a circle about the lens axis as the ellipse 11a is nutated. Such nutation is equivalent to rotating a portion (not numbered but shown in heavy line) of the ellipse 11a about the lens axis to form an ogive. The generatrix of a secondary mirror 15 is an ellipse 15a. One focal point of the ellipse 15a is moved about the lens axis to describe a circle coincident with the focal circle of the focus $F_o'$ of the ellipse 11a. The second focal point $F_2$ of the ellipse 15a is caused to describe a focal circle about the lens axis as the ellipse 15a is nutated. Such nutation is equivalent to rotating a portion of the ellipse 15a about the lens axis to form the concave reflecting surface of the exit mirror 15. It will now be evident that the entrance mirror 11 and the exit mirror 15 are "confocal," meaning that each share a common focal circle $F_o'$.

A plurality (here four) of lasers 17a, 17b, 17c, 17d are disposed so that the central ray of the beam from each one of them is directed toward the focal point $F_o$, each such beam falling on a portion of the reflecting surface of the entrance mirror 11. The beam from each one of the lasers 17a through d is, before reaching the entrance mirror 11, passed through a focusing arrangement 19a, 19b, 19c, 19d. Each such focusing arrangement may, for example, be of the type shown in my copending application entitled "Catoptric Lens Arrangement," Ser. No. 244,393. That is, each such arrangement may include a "parahyperboidal" entrance mirror and a "parellipsoidal" exit mirror having a common focal circle whereby the diverging beam from each laser is caused to focus toward the focal point $F_o$. Suffice it to say here that the "parahyperboidal" mirror has a convex reflecting surface generated by nutating a hyperbola about a lens axis, one focal point of such curve being held on such axis and the second focal point of such curve describing a circle about such axis. The "parellipsoidal" mirror has a concave reflecting surface generated by nutating an ellipse about the lens axis so that one focal point of such curve is confocal with the focal circle of the parahyperboidal mirror and the second focal point of such curve is on the lens axis. Each laser is placed at the "on axis" focal point of the parahyperboidal mirror and the "on axis" focal point of such parellipsoidal mirror is made to be coincident with $F_o$.

It may be seen therefore that a converging beam out of the focusing lens arrangement 19a, after reflection from the entrance mirror 11, will appear to have originated at a point on the focal circle $F_o'$. Similarly, the converging beam from each one of the other focusing arrangements 19b, 19c, 19d will appear to have originated at other points on the focal circle $F_o'$. It will be evident that, because the entrance mirror 11 is ogival, additional lasers and focusing arrangements (not shown) may be disposed to direct more beams than illustrated toward the focal point $F_o'$. In other words, beams from an array of as many lasers as desired may be reflected from the entrance mirror 11 in such a way that the virtual source of each one of such beams is on the focal circle $F_o'$. (In this connection it should be noted that the focusing arrangements 19a through 19d may be varied as desired so that the distance from each laser to the entrance mirror 11 may be changed as desired or convenient). After reflection from the exit mirror 15, the optical energy of each one of the beams originating at each one of the lasers 17a through 17d (or other lasers) is focused toward a corresponding point on the focal circle $F_2$.

As may be seen in FIG. 1, the rays in each beam cross the lens axis adjacent to the focal circle $F_2$. It follows, then, that as the rays in each beam converge toward their focal point, there is a region (the region marked "B") extending for a finite distance along the lens axis and near such axis in which the flux density of each beam is very high. Further, because of the symmetry of the entrance mirror 11 and the exit mirror 15, the flux density at a given distance from the lens axis at the region B is substantially constant (assuming an equal flux density in each beam out of each laser illuminating overlapping portions of the entrance mirror 11 and simultaneous activation of the individual lasers so that light from each laser arrives simultaneously at the entrance mirror 11). If the lasers 17a through d for example, are pulsed $CO_2$ lasers disposed equidistant from the entrance mirror 11 it is necessary that they be caused to lase simultaneously, as by a common pumping arrangement 21 of conventional design. To put it generally, the lasers 17 are positioned with respect to the entrance mirror 11 and actuated in such a manner that optical energy from each laser arrives at the region B simultaneously.

It will now become evident that the angle of incidence of rays arriving at region B may be varied within wide limits by changing the eccentricity of each one of the generating ellipses 11a, 15a, thereby making it possible to use different portions of such ellipses to generate the reflecting surfaces of the entrance mirror 11 and the exit mirror 15. Obviously, changes in the eccentricity of the ellipses 11a and 15a cause a corresponding change in the position of the focal circle $F_2$ along the lens axis and a corresponding change in the position and length of the region B along the lens axis. In any event, however, it may be seen that region B is substantially cylindrical.

Figure 2:
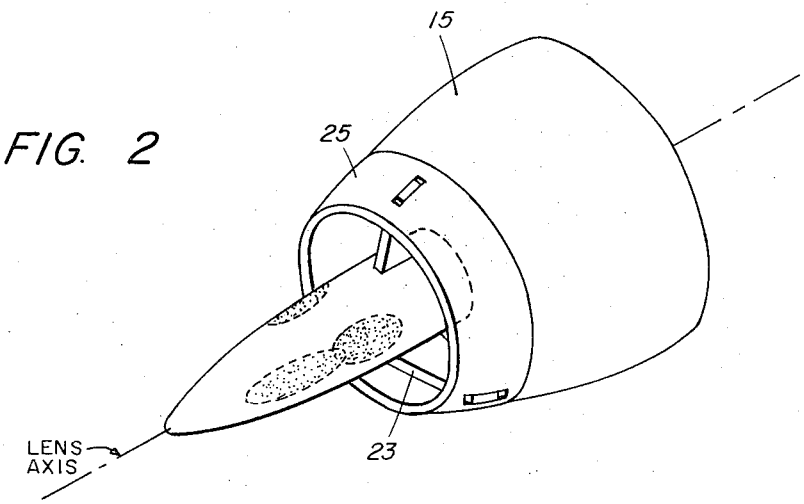
FIG. 2 is a simplified perspective view of a catoptric lens arrangement following the arrangement shown in FIG. 1.

Referring now to FIG. 2 it may be seen that the entrance mirror 11 and the exit mirror 15 may be held in a fixed spatial relationship one to the other by means of a number (say three) of spiders 23 as shown in detail in my previously filed application entitled "Catoptric Lens Arrangement," Ser. No. 244,393, filed Apr. 17, 1972 and assigned to the same assignee as this application. Suffice it to say here that entrance mirror 11 is adjustably secured to a mounting ring 25 to which the exit mirror 15 is affixed. It is evident that the position of the mounting ring and the exit mirror 15 may be varied together with respect to the entrance mirror 11 to achieve the desired confocality. Obviously, also, the entire lens arrangement may be attached in any convenient way to a mount by structure (not shown) around the mounting ring 25. It will be evident that the presence of the spiders 23 in the path of the optical energy passing through the illustrated lens arrangement may cause some aperture blockage. The amount of such blockage may be minimized by proper disposition of the spiders 23 so that little, if any, of the energy from any of the lasers is intercepted by the spiders 23.

Figure 3:
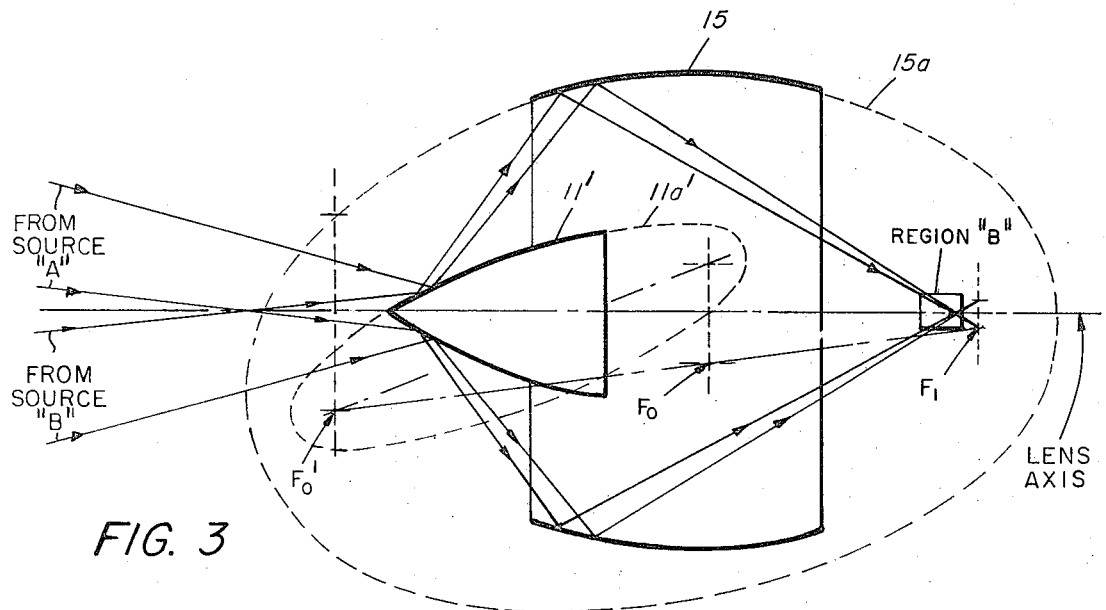
FIGS. 3 and 4 are simplified meridional views of alternative embodiments of the contemplated lens arrangement, such alternative embodiments including an entrance mirror adapted to receive collimated beams of optical energy from a number of high powered lasers.

Referring now to FIG. 3, an alternative catoptric lens arrangement, quite similar to that shown in FIG. 1, is illustrated. The difference between the two lies in the way in which the entrance mirror 11' of FIG. 3 is formed. Thus, the reflecting surface of the entrance mirror 11' is generated by rotating a portion of an ellipse 11a' about the lens axis, the focal points of such ellipse being removed from such axis. A moment's thought will make it clear that, with an entrance mirror so formed, the beam from any of a number of lasers may be directed so as to illuminate substantially the same area of the reflecting surface of the entrance mirror. As shown then, the beams may be "mixed" in passing through the illustrated lens arrangement. Such "mixing" obviously reduces the effect of differences in the flux density of the beams from different sources as the optical energy is concentrated at region B.

Figure 4:
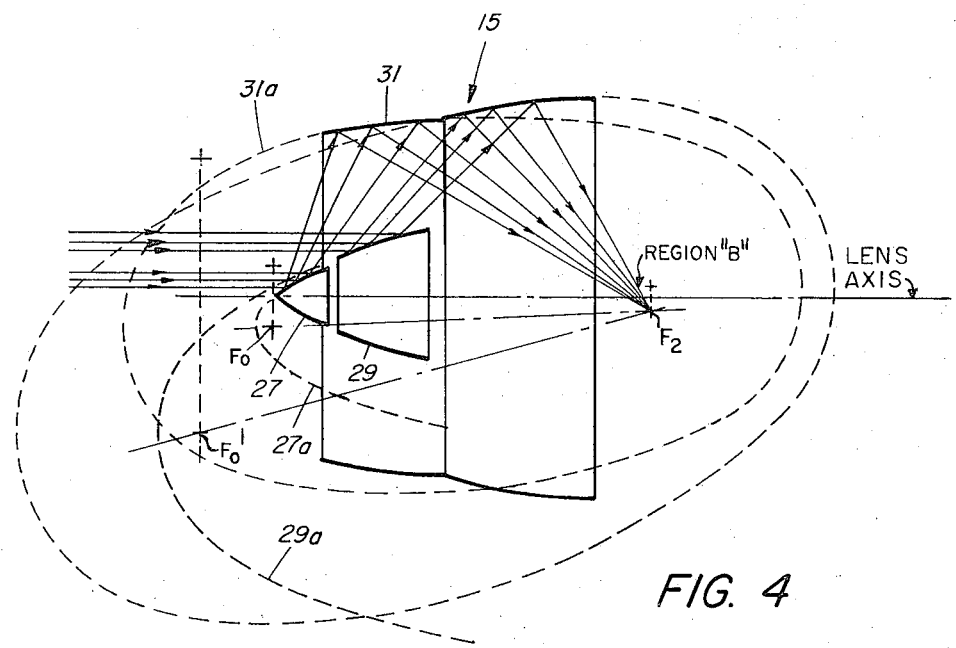

Referring now to FIG. 4, it may be seen that the lens arrangement shown in FIG. 1 may be changed to accommodate collimated beams of optical energy. Thus, as shown in FIG. 4, the entrance mirror may be generated by rotating a selected portion of two parabolas 27a, 29a about a lens axis. A "zoned" paraboloidal reflecting surface having a reflector 27 and a reflector 29 results. It will be noted that, as shown in FIG. 4, the focal points of the parabolas 27a, 29a are not coincident, thereby permitting reflectors 27, 29 to be faired. It is possible, however, to have the focal points of the parabolas 27a, 29a coincident.

The exit mirror of FIG. 1 is also "zoned." That is, one reflector 31 is formed by rotating a portion of an ellipse 31a about the lens axis (again the equivalent of nutating an ellipse 31a about the lens axis so that one focal point is coincident with the focal circle of the parabola 27a). The reflector 33 is similarly formed by ellipse 33a so that it has a focal circle coincident with the focal circle of the parabola 29A. The second focal points of the two ellipses generating the reflectors 31, 33 are confocal at a circle $F_2$ about the lens axis. It may be seen, therefore, that axial rays, (as rays from a number of distant sources not shown in FIG. 3 or collimated beams from an array of lasers) falling on the reflector 27 will be reflected therefrom in diverging beams which apparently originate from points on the focal circle of the parabola 27a. Such diverging rays, after reflection from the reflector 31, are directed to points along the focal circle $F_2$, contributing to the formation of an optical bottle at region B in the same way as described in connection with FIG. 1. Axial rays from other distant sources or collimated beams from lasers falling on the reflector 29 are reflected therefrom as though they had originated at points on the focal circle of the parabola 29a. Again, after reflection from the reflector 33 such rays are focused at points along the focal circle $F_2$ thereby completing the formation of the optical bottle. It will be noted that the embodiment just described requires a larger aperture than the embodiment shown in FIG. 1. This is so because the position of the lasers or other distance sources must be such that only axial rays fall on the reflectors 27, 29. On the other hand, however, the position of the lasers in the embodiment shown in FIG. 1 is not so limited.

Having described preferred embodiments of this invention, it will now be apparent to one of skill in the art that many changes may be made without departing from my inventive concepts. Thus it is evident that more than one of the disclosed lens arrangements may be disposed so as to contribute to the formation of the optical compressor. Further, it will be obvious that the shape of the entrance mirror may be changed to that corresponding to nutating one or more hyperbolas to allow initially diverging beams from a number of lasers to be concentrated at the region B. It is felt therefore that this invention should not be restricted to its disclosed embodiments but rather should be limited only by the spirit and scope of the appended claims.

What is claimed is:

1. A catoptric lens arrangement having a first and a second lens element disposed along a lens axis, such arrangement being adapted to combine, on a cylindrical surface adjacent to the lens axis, optical energy from each one of a plurality of sources and comprising:

a. an entrance mirror having a reflecting surface corresponding to the surface described by moving a portion of a first selected quadratic conic section about the lens axis, a focal point of such conic surface tracing a first focal circle spaced from the lens axis;

b. an exit mirror having a reflecting surface corresponding to the surface described by a portion of a second selected quadratic conic section having a pair of focal points nutated about the lens axis, one of such focal points tracing a second focal circle having a radius equal to the radius of the first focal circle and the other one tracing a final focal circle having a radius approximately equal to the radius of the cylindrical surface; and c. means for mounting the entrance mirror and the exit mirror to make the first and the second focal circles coincident.

2. A catoptric lens arrangement as in claim 1 wherein the first selected quadratic conic section is a parabola.

3. A catoptric lens arrangement as in claim 1 wherein the first selected quadratic conic section is a hyperbola.

4. A catoptric lens arrangement as in claim 1 wherein the first selected quadratic section is a first ellipse, one focal point thereof tracing the first focal circle and the second focal point thereof being a point on the lens axis.

5. A catoptric lens arrangement as in claim 1 wherein the first selected quadratic section is an ellipse nutated around the lens axis, the focal points of such ellipse tracing focal circles around the lens axis.

6. A catoptric lens arrangement as in claim 4 wherein the second selected quadratic conic section is a second ellipse.

7. A catoptric lens arrangement for combining, at a region adjacent to a lens axis, optical energy from different sets of lasers, such arrangement comprising:
   a. a zoned entrance mirror having a first and a second convex reflecting surface, respectively, to the surface described by moving a portion of a different quadratic conic surface about the lens axis, a focal point of each such conic surface tracing a circle about the lens;
   b. a zoned exit mirror having a first and a second concave reflecting surface, corresponding, respectively, to a portion of the surface described by a first and a second ellipse nutated around the lens axis, one focal point of each such ellipse tracing a focal circle corresponding to one of the focal circles of the zoned entrance mirror and the second focal point of each such ellipse tracing a common focal circle about the lens axis adjacent to the region; and
   c. means for mounting the zoned entrance mirror and the zoned exit mirror to render the focal circles coincident.

8. A catoptric lens arrangement as in claim 7 wherein the quadratic conic sections of the zoned entrance mirror are parabolas.

9. A catoptric lens arrangement as in claim 7 wherein the quadratic conic sections of the zoned entrance mirror are ellipses.

* * * * *